Patented Oct. 15, 1929

1,731,800

UNITED STATES PATENT OFFICE

MERVILLE S. THOMPSON, OF PENNS GROVE, NEW JERSEY, ASSIGNOR TO E. I. DU PONT DE NEMOURS & COMPANY, OF WILMINGTON, DELAWARE, A CORPORATION OF DELAWARE

INDANTHRONE COMPOUND AND PROCESS OF MAKING SAME

No Drawing. Original application filed June 9, 1922, Serial No. 567,172. Divided and this application filed July 24, 1924. Serial No. 727,990.

This invention relates to the production of N-dihydro-1,2,1',2'-anthraquinone-azine and its derivatives, and comprises as a new dye, the product obtainable by subjecting 2-amino-anthraquinone or its derivatives to the action of a fused caustic alkali in the presence of metal phenolates, and particularly alkali-metal phenolates.

This application is a division of my Patent No. 1,580,700, April 13, 1926.

By fusing beta-amino-anthraquinone in caustic potash or a mixture of the latter with caustic soda, in the presence of a phenolate of sodium or potassium, there is obtained a higher yield of indanthrone (that is, N-dihydro-1,2,1',2',-anthraquinone-azine) than if the fusion is carried out without the presence of a phenolate. Furthermore, I believe that this process of fusing beta-amino-anthraquinone in the presence of a phenolate of sodium or potassium produces an indanthrone, either on a laboratory or plant scale, which is different from the indanthrone which is sold on the market and known commercially as Indanthrene Blue RS. It is a well-known fact that one of the principal disadvantages of indanthrone is the fugitive character of its shade when dyed on cotton and subjected to the action of a bleach solution. For example, if one or two percent dyeings of indanthrone are subjected to the action of a dilute hypochlorite solution of a strength corresponding to one-quarter to one-half percent of active chlorine at a temperature of 20° C. for one-quarter of an hour the shade changes quite rapidly from a blue to a dull green. For this reason the major portion of the commercial indanthrone is sold as the halogenated derivatives chiefly because the latter withstand the bleach treatment considerably better than the non-halogenated indanthrone. Therefore, it is obvious that a non-halogenated indanthrone which remains blue when dyed on cotton and subjected to the action of bleach liquor is a more valuable product than one which does not remain blue after a bleach treatment. From dyeings of my new indanthrone (known as Ponsol Blue R) which was made both in the laboratory and in the plant by the phenolate process it has been found that Ponsol Blue R remains bluer after bleach treatment than commercial Indanthrene Blue RS when subjected to identical treatment. The N-dihydro-1,2,1',2'-anthraquinone-azine and the derivatives thereof (such as the halogenated compounds) produced by my process from beta-amino-anthraquinone and derivatives thereof respectively, I shall term indanthrones, and wish to be understood as referring generically to N-dihydro-1,2,1',2'-anthraquinone-azine and derivatives thereof where hereafter I use the expression indanthrones.

In producing this new dyestuff I start with a beta-amino-anthraquinone of high quality and add it to a molten mass of caustic potash or a mixture of the latter with caustic soda, preferably in the presence of an oxidizing agent such as potassium nitrate or potassium chlorate. I have discovered that this reaction is promoted, and an increased yield of blue coloring matter which exhibits better resistance to bleach treatments than ordinary commercial indanthrene blue is obtained by carrying this reaction out in the presence of a phenolate of a metal such as sodium or potassium. After I add all of the required amount of beta-amino-anthraquinone, I drown the hot melt in water and precipitate the color by blowing in air.

The following examples will serve to further illustrate the nature of this invention and the manner in which it can be carried out, but of course the invention is not confined to these examples:

(1) A mixture of potassium hydroxide (350 grams) and sodium hydroxide (100 grams) are fused between 250 and 300° C. and the thin melt is then cooled down to about 220° C. Potassium chlorate (23 grams) is then added, followed by a slow addition of sodium phenolate (50 grams). Powdered beta-amino-anthraquinone (120 grams) is then added while the melt is under agitation at a temperature of 195–200° C. After the beta-amino-anthraquinone has been all added the temperature of the melt is raised to 230° C. and held at this temperature for a period of an hour or more. The melt is then poured into water and the coloring matter is completely precipitated by blowing an excess of air into the boiling solution.

(2) A mixture of potassium hydroxide (32 pounds) and sodium hydroxide (13 pounds) are fused at 250–270° C. and the thin melt is then cooled to about 220° C. Potassium chlorate (1.75 pounds) is then added, followed by a slow addition of sodium cresolate (5 pounds). Powdered 2-amino-anthraquinone (12 pounds) is then added with good agitation, and the mixture heated at about 230° C. for about an hour. The melt is then poured into water and the coloring matter is completely precipitated by blowing air into the boiling solution.

To illustrate the substantial increase in yield resulting from the use of metal phenolates, the actual increases in yield caused by the above-mentioned phenolates were as follows:

|  | Per cent |
|---|---|
| Sodium phenolate | 20 |
| Sodium cresolate | 15 |

The conditions of operation are not, of course, limited to the exact conditions specified in the two above examples. For instance the alkalies can be fused at any reasonably high temperature but they must be molten at a temperature of 220° C. The oxidizing agents above-mentioned (whose presence, though desirable, is not essential) should not be added above 220° C. The amount of oxidizing agent specified in Example (2) is 5% in excess of the theoretical amount required. Any decrease in this amount is detrimental to the operation. An increase of 200 or 300% is neither beneficial nor detrimental. The 2-amino-anthraquinone may be added to the melt at a temperature of not less than 195° C. or more than 250° C. In respect to the proportion of materials not less than 3.75 parts of alkalies should be used per one part of 2-amino-anthraquinone.

With respect to the proportion of organic hydroxylate (phenolate), I prefer to use from about 10 to 12% thereof based upon the weight of fused caustic alkali employed. A smaller proportion of metal phenolate will increase the yield of azine derivative, but not to so great an extent as when about 12% is used. No special advantage appears to result from the use of amounts of hydroxylate in excess of 12%.

I claim:

1. The process of producing indanthrones which comprises causing a fused caustic alkali to act on a 2-amino-anthraquinone compound in the presence of an organic hydroxylate of an alkali-metal.

2. The process of producing indanthrones which comprises causing a fused caustic alkali to act on a 2-amino-anthraquinone compound in the presence of the phenolate of an alkali-metal.

3. The process of producing indanthrones which comprises causing a fused caustic alkali to act on a 2-amino-anthraquinone compound in the presence of sodium phenolate.

4. A process as defined in claim 3 in which the proportion of phenolate is equal to about 10 to 12% of the weight of caustic alkali used.

5. The process of producing indanthrones which comprises causing a fused mixture of sodium and potassium hydroxides to act on a 2-amino-anthraquinone compound in the presence of a phenolate of an alkali-metal.

6. The process of producing indanthrones which comprises causing a fused mixture of sodium and potassium hydroxides to act on a 2-amino-anthraquinone compound in the presence of sodium phenolate.

7. The process of producing indanthrones which comprises causing a fused caustic alkali to act on a 2-amino-anthraquinone compound in the presence of an oxidizing agent and a phenolate of an alkali-metal.

8. The process of producing indanthrones which comprises causing a fused mixture of sodium and potassium hydroxides to act on a 2-amino-anthraquinone compound in the presence of an oxidizing agent and a phenolate of an alkali-metal.

9. The process which comprises adding 2-amino-anthraquinone to a melt containing fused sodium and potassium hydroxides, potassium chlorate, and sodium phenolate, heating the mixture at a temperature in the neighborhood of 220° C. until the 2-amino-anthraquinone has been converted into indanthrone, and then pouring the reaction mass into water.

In testimony whereof I affix my signature.

MERVILLE S. THOMPSON.